US012195973B2

(12) United States Patent
Rocchetta (10) Patent No.: US 12,195,973 B2
(45) Date of Patent: Jan. 14, 2025

(54) FLAME-RESISTANT COMPOSITE SUBSTRATES FOR BITUMINOUS MEMBRANES

(71) Applicant: POLITEX S.A.S. DI FREUDENBERG POLITEX S.R.L., Novedrate (IT)

(72) Inventor: Luigi Rocchetta, Brembio (IT)

(73) Assignee: POLITEX S.A.S. DI FREUDENBERG POLITEX S.R.L., Milan (IT)

( * ) Notice: Subject to any disclaimer, the term of this patent is extended or adjusted under 35 U.S.C. 154(b) by 566 days.

(21) Appl. No.: 17/608,756

(22) PCT Filed: May 4, 2020

(86) PCT No.: PCT/EP2020/062295
§ 371 (c)(1),
(2) Date: Nov. 4, 2021

(87) PCT Pub. No.: WO2020/225200
PCT Pub. Date: Nov. 12, 2020

(65) Prior Publication Data
US 2022/0316212 A1   Oct. 6, 2022

(30) Foreign Application Priority Data

May 6, 2019   (EP) .................................... 19172741

(51) Int. Cl.
*E04D 5/10*   (2006.01)
*D06N 5/00*   (2006.01)
*E04B 1/94*   (2006.01)

(52) U.S. Cl.
CPC ............... *E04D 5/10* (2013.01); *D06N 5/003* (2013.01); *E04B 1/94* (2013.01);
(Continued)

(58) Field of Classification Search
CPC ............ B32B 5/022; B32B 5/06; B32B 5/26; B32B 33/00; B32B 2262/0246;
(Continued)

(56) References Cited

U.S. PATENT DOCUMENTS 6,131,351 A   10/2000   Locatelli
6,235,657 B1   5/2001   Schops
(Continued)

FOREIGN PATENT DOCUMENTS

CN   104611839 A   5/2015
CN   106042572 A   10/2016
(Continued)

OTHER PUBLICATIONS

Varga, K. et al., "Thermal and Sorption Study of Flame Resistant Fibers", Lenziger Berichte 89, Jan. 2011, pp. 50-59, Lenzing AG, Lenzing, Austria.

*Primary Examiner* — Camie S Thompson
(74) *Attorney, Agent, or Firm* — LEYDIG, VOIT & MAYER, LTD.

(57) ABSTRACT

A porous composite substrate for producing bituminous membranes, comprising a first nonwoven and a second nonwoven layer which comprise polyester fibers, and an intermediate nonwoven layer comprising organic flame-resistant fibers. A combustion temperature of the organic flame-resistant fibers is at least 500° C. and/or a limiting oxygen index (LOI) of the organic flame-resistant fibers is at least 25%. The composite substrate is mechanically consolidated.

21 Claims, 1 Drawing Sheet (52) U.S. Cl.
CPC ............... *D06N 2201/0245* (2013.01); *D06N 2209/067* (2013.01); *D06N 2209/103* (2013.01); *D06N 2211/06* (2013.01)

(58) Field of Classification Search
CPC .... B32B 2262/0269; B32B 2262/0276; B32B 2262/10; B32B 2419/06; B32B 2307/3065; B32B 2307/50; B32B 2307/734; B32B 17/02; B32B 2305/20; B32B 2262/101; B32B 37/156; E04D 13/16; E04D 5/10; E04D 5/02; E04B 1/66; E04B 1/94; B01D 46/001; B29C 71/0009; D06N 5/003; D06N 2201/0245; D06N 2209/067; D06N 2209/103; D06N 2209/1642; D06N 2211/06; D06N 7/006; E04F 15/10; E04F 15/186; D04H 1/46; D04H 1/498; D04H 1/4218; D04H 1/488; D04H 5/02; D04H 18/00; Y10T 442/2992; Y10T 442/2738; Y10T 442/607; Y10T 442/662; Y10T 442/102; Y10T 442/659; Y10T 442/666; Y10T 428/2904; Y10T 428/2969; Y10T 428/2915

USPC ............................................ 442/327; 264/48
See application file for complete search history.

(56) References Cited

U.S. PATENT DOCUMENTS

| | | | |
|---|---|---|---|
| 2014/0083066 A1* | 3/2014 | Bahukudumbi | .... B29C 71/0009 264/48 |
| 2015/0259919 A1 | 9/2015 | Lewis | |

FOREIGN PATENT DOCUMENTS

| | | | | |
|---|---|---|---|---|
| EP | 0572891 | B1 | 12/1993 | |
| EP | 1134479 | A2 | 9/2001 | |
| EP | 1200659 | A2 * | 5/2002 | ............ B32B 17/02 |
| EP | 1200257 | B1 | 3/2003 | |
| WO | WO 9718364 | A2 | 5/1997 | |
| WO | WO 0168341 | A1 | 9/2001 | |
| WO | WO 02070246 | A1 | 9/2002 | |
| WO | WO 2012/065903 | A1 | 5/2012 | |
| WO | WO 2013064859 | A1 | 5/2013 | |

* cited by examiner

FLAME-RESISTANT COMPOSITE SUBSTRATES FOR BITUMINOUS MEMBRANES

CROSS-REFERENCE TO PRIOR APPLICATIONS

This application is a U.S. National Phase application under 35 U.S.C. § 371 of International Application No. PCT/EP2020/062295, filed on May 4, 2020, and claims benefit to European Patent Application No. 19172741.1, filed on May 6, 2019. The International Application was published in English on Nov. 12, 2020 as WO 2020/225200 under PCT Article 21(2).

FIELD

The invention relates to a porous composite substrate for producing bituminous membranes, comprising a first nonwoven and a second nonwoven layer, which comprise polyester fibers, and an intermediate nonwoven layer comprising organic flame-resistant fibers. Subject of the invention are also production methods, bituminous membranes comprising such composite substrates and uses of flame-resistant fibers.

BACKGROUND

Bituminous membranes are widely used as shielding and waterproofing means in building applications, especially roofing applications. They are normally provided in the form of rollable sheets. Bituminous membranes are typically produced from textile substrates, which can be bonded with a binder, and which are impregnated with a high amount of bitumen.

Textile substrates for producing bituminous membranes must have a high stability and specific mechanical properties. They must be suitable for handling, machining and impregnation with bitumen at hot temperature in the range of 160° C. to 220° C. They must confer stability to the bituminous membranes during building applications, when they are subjected to heat, cold, moisture and stress for extremely long time periods. The textile substrate must be mechanically stable to avoid damages by mechanical forces under typical processing and machining conditions at normal and hot temperature. At the same time, the substrate must be flexible, rollable and highly stable at hot temperature, such that they can be impregnated with molten bitumen in standard processing devices. Moreover, the bituminous membrane and substrate must be flexible and also mechanically stable such that they can be applied to a building or roofing site, when the bituminous membrane is unrolled, softened with a hot flame and often also bent and torn to cover uneven surfaces. And even further, the substrate must impart stability to the bituminous membrane for many years in building applications under excessive heat, cold, wetness and external mechanical stress. Overall, it is extremely important that the textile substrates do not exhibit cracks, punctures or other damages in all these procedures and applications, which could result in loss of the required sealing effect.

Conventional substrates for bituminous membranes are often provided in the form of nonwoven sheets from organic polymer fibers, especially polyester fibers, which can be reinforced with glass fibers. For example, such composite substrates are described in EP 1 200 257 B1.

In many applications, it is desired that bituminous membranes additionally function as fire barriers. Fire barrier properties are typically conferred to composite substrates by incorporation of flame-retardant additives or functional parts.

To have fire barrier property, some commercially available roofing carrier nonwovens are equipped with metal foils, such as copper or aluminum foils. However, such metal foils have low affinity for bitumen and for polyester fibers. Therefore, the production is difficult and the composite materials tend to delaminate. Further, composites comprising metal foils generally have undesired high stiffness and metal foils are easily damaged. It is also disadvantageous that thin metal foils are relatively expensive. Thus, such composite materials have various disadvantages and could still be improved.

Other conventional composite substrates with fire barrier properties are organic fiber nonwovens which comprise a glass fiber nonwoven layer. Glass fibers are inorganic and non-combustible and confer fire-resistance to such a composite. However, glass fiber nonwovens are overly stiff Thus, bituminous membranes comprising such composite substrates are not flexible enough for standard applications and difficult to handle. Further, the mechanical stability of such composite substrates can be relatively low. Glass fiber nonwovens and respective composites have a relatively low tensile strength and low elongation at break. Thus, they can be damaged in the production process and during use, which can impair the fire-barrier and sealing effect. Even further, the irritation risk of a glass fiber nonwoven is high. The use of glass staple fibers in building applications may also not be desired for health and environmental reasons. Some commercially available composite substrates for bituminous membranes combine two polymer fiber nonwovens with an intermediate glass fiber nonwoven layer. However, such composites also have inadequate mechanical properties regarding stiffness, tensile strength and elongation at break, and also have a high irritation risk. They are also expensive, because the production process requires multiple steps and is relatively complex. Therefore, conventional materials comprising glass fiber fire barrier layers have various disadvantages and could still be improved.

Other commercial composite substrates with fire barrier properties comprise nonwoven layers produced from a mixture of organic polymer fibers and glass staple fibers, which are bonded together with a binder. However, the mechanical properties of such composite materials can also be inadequate, because the glass fibers confer stiffness and low flexibility to such composites for the same reasons as outlined above. Also in such a mixed fiber nonwovens, the glass staple fibers have a high irritation risk and are not desirable for environmental and health reasons. Therefore, such products do not overcome the problems described above for organic fiber nonwovens with flame resistant glass fibers.

In order to overcome the deficiencies of fire barrier composite substrates outlined above, it has been suggested to include organic flame-retardant additives into composite substrates.

US 2015/0259919 A1 suggests a material for various roofing applications, which comprises a substrate from carbon based fiber and a weather-proof or water-resistant coating applied or affixed to said substrate. Generally, such thickly coated substrates do not have advantageous mechanical properties of textile nonwovens. The document is also silent about specific mechanical properties, fire barrier effect and applications of such materials.

WO 01/68341 A1 relates to a fire combustion modified batt from a blend of fibers, such as oxidized polyacrylonitrile fibers and carrier fibers. The batt is bonded with a binder and shall be applicable for a list of very different applications. Applications for bituminous membranes are not suggested. The document is silent about specific mechanical properties of such batts.

EP 1 134 479 A2 relates to burn-through resistant nonwoven mats based on flame-resistant fibers for aircraft applications. The document does not relate to building applications or bituminous membranes and is silent about specific mechanical properties of such nonwoven mats.

WO2013/064859A1 discloses a rigid composite material, which is obtained by hot-pressing (thermoforming). In the thermoforming process, a fiber layer laminate is impregnated with a thermosetting resin in a mould and subjected to pressure and heat. Thereby, a stiff moulded part is obtained which can be used as a structural component for automobiles, such as dashboard or door panels. Since pressure is applied, the product is not porous. It cannot be impregnated with bitumen and is not suitable as a substrate for producing bituminous membranes.

CN106042572A relates to a train seat fabric comprising flame-retardant polyester fibers. The fibers are spun from mixtures of phosphorylated polyester raw material and a large number of additives, such as flame retardants, lubricant, excipients and metal salt mixtures. The laminate has a complex structure and the production comprises many process steps. Flame retardant polyester has a relatively low LOI in the range of 20 to 21% and a combustion temperature of 480° C. Thus, the flame retardant properties of the seat fabric could still be improved. Further, the product has a high thickness of at least 10 cm to 40 cm and is thus not suitable as a carrier for forming bituminous membranes.

WO2012/065903A1 discloses a reinforced textile support, particularly for bituminous membranes, which comprises nonwoven webs of synthetic fibers and reinforcement yarns based on cellulose. The document does not relate to flame-resistant composites and their production.

Overall, the prior art regarding flame-resistant nonwovens based on flame-resistant fibers does not specifically relate to bituminous membranes for building applications. The documents also do not comprise information about specific mechanical or other relevant properties, which could render them suitable for bituminous membrane production and use. Especially, they do not relate to specific properties at cold and hot temperature, which are required for producing and using bituminous membranes.

SUMMARY

In an aspect, the present invention provides a porous composite substrate for producing bituminous membranes, comprising a first nonwoven and a second nonwoven layer which comprise polyester fibers, and an intermediate nonwoven layer comprising organic flame-resistant fibers. In an aspect, a combustion temperature of the organic flame-resistant fibers is at least 500° C. and/or a limiting oxygen index (LOI) of the organic flame-resistant fibers is at least 25%. In an aspect, the composite substrate is mechanically consolidated.

The problem underlying the invention is to provide flame-resistant substrates for bituminous membranes which overcome the above mentioned problems. The substrates shall be highly flame-resistant. Preferably, they shall pass standard tests for building materials to external fire exposure, such as EN 1187.

The substrates shall have mechanical properties which are required and advantageous for producing and using bituminous membranes. Specifically, they shall combine flexibility with high mechanical strength. The materials shall have advantageous properties at room temperature and at hot temperature. More preferably, they shall have low deformation and a high Young modulus and high tensile strength at hot temperature. The substrates shall be rollable and workable in standard machinery at normal temperature, but also hot temperature.

Further, the substrates shall overcome problems of common composite substrates, such as delamination, low compatibility with bitumen, undue stiffness, low mechanical strength, irritation and health and environmental concerns.

It is a further problem underlying the invention to provide advantageous methods for producing such substrates, to provide respective bituminous membranes and uses. It is also a problem underlying the invention to provide materials which are accessible by relatively simple methods with a low number of process steps.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Surprisingly, it was found that the problem underlying the invention is overcome by composite substrates, bituminous membranes, uses and methods according to the claims. Further embodiments of the invention are outlined throughout the description.

Subject of the invention is a porous composite substrate for producing bituminous membranes, comprising
  a first nonwoven and a second nonwoven layer, which comprise polyester fibers, and
  an intermediate nonwoven layer comprising organic flame-resistant fibers, wherein the combustion temperature of the organic flame-resistant fibers is at least 500° C. and/or the limiting oxygen index (LOI) of the organic flame-resistant fibers is at least 25%,
  wherein the composite substrate is mechanically consolidated.

The substrate is a composite, because the first and the second nonwoven layer comprise different fibers than the intermediate nonwoven layer.

The substrate is applicable for producing bituminous membranes, because it can be impregnated with molten bitumen at a hot temperature of about 180° C. Basically, it is mechanically stable and does not lose its integrity at such a hot temperature. The composite substrate is also susceptible to impregnation with bitumen. It is porous, and thus does not form a closed film.

The composite substrate comprises at least three different nonwoven layers which are laid over each other. The first and the second nonwoven layer comprise polyester fibers.

Although polyester fibers have relatively high heat stability, they are not "organic flame-resistant fibers" as present in the intermediate layer.

The intermediate nonwoven layer comprising organic flame-resistant fibers is positioned between the first and second nonwoven layer. The intermediate layer comprises organic flame-resistant fibers. According to this disclosure, "flame resistant" refers to a material by which flaming and combustion is slowed, terminated or prevented. Flame retardancy can be an inherent property of the fibers or can be imparted to the fibers by a specific treatment, for example by impregnating the fiber surface with a flame-resistant agent. It is preferred that the fibers are inherently flame resistant, because such an inherent property is generally more permanent. This is advantageous for building applications, in which bituminous membranes are normally used for very long time periods in the range of many years.

The first, second and intermediate layer in the composite substrate are nonwoven layers. According to the general definition in the technical field of ISO 9092, a nonwoven is a sheet of fibers or continuous filaments that has been formed into a web by any means and bonded together by any means with the exception of weaving or knitting. Preferably, the fibers forming the nonwoven are randomly orientated. Preferably, they are bonded by friction, cohesion and/or adhesion. Preferably, the amount of fibers in the nonwoven is at least 60% by weight, more preferably at least 80% by weight. The nonwoven is not a paper. Specifically, it does not comprise high amounts of cellulose, such as more than 10% or more than 50% by weight.

The overall composite substrate is a laminate sheet material. In cross-sectional view, the intermediate layer is positioned between the first and second layer. The composite substrate may comprise additional layers. It is preferred, but not required that the intermediate nonwoven layer is in direct contact with the first nonwoven and/or second nonwoven layer.

The composite substrate can be prepared from distinct nonwoven layers, which are combined and bonded to each other. Alternatively, precursor webs and/or pre-formed nonwovens can be combined and bonded to each other. It is not required that the different nonwoven layers in the composite substrate have discrete boundaries. Rather, the layers may comprise regions in which the fiber materials from adjacent layers penetrate each other. In fact, such a structure can be preferred for tightly connecting adjacent layers, thereby preventing delamination. Nonetheless, the first, second and intermediate layer are different layers which can be clearly distinguished in a cross-sectional view.

The intermediate layer comprises flame-resistant fibers and confers fire barrier properties to the composite substrate. Thus, the overall composite substrate, and also a bituminous membrane comprising such a composite substrate, can act as a fire barrier. In the technical field of building materials, this is advantageous for avoiding fire propagation. The fire barrier can prevent or slow further development of ignition. A fire barrier function is especially advantageous in bituminous membrane, because hot bitumen can be molten in the presence of fire and flow or drip into a building interior, thereby causing fire propagation. For an efficient and reliable fire barrier, it is important that such a material is mechanically stable and does not form holes or cracks. In case of fire on the outside, membranes with holes or other damages may fail in preventing hot bitumen from entering the building interior. Thus, it is important that such roofing materials do not only provide an efficient fire barrier, but that are also mechanically highly stable at cold and hot temperature. The performance of roofing materials to external fire exposure can be determined by standardized tests, for example EN 1187.

For a strong fire barrier function, it is preferred that the ratio of the organic flame-resistant fibers in the intermediate nonwoven layer is relatively high. Preferably, all fibers in the intermediate layer are organic flame-resistant fibers. In other embodiments, at least 70%, at least 80% or at least 90% by weight of all fibers in the intermediate layer are organic flame-resistant fibers. It is preferred that no inorganic flame-resistant fibers are present in the intermediate layer. In addition, the intermediate layer may comprise a binder or other non-fiber additives. In another embodiment, the intermediate layer consists of the organic flame-resistant fibers.

The organic flame-resistant fibers in the intermediate layer are carbon-based. They are not inorganic, such as glass or silica fibers. Preferably, they are inherently flame-resistant, i.e. due to their fiber polymer material, and not only due to a flame-resistant coating or additives. Preferably, the organic flame-resistant fibers are partially carbonized, such that they comprise a relatively high carbon content.

Fibers made from organic fire-resistant polymers have relatively good flame-resistant properties, such that they are applicable for producing fire barrier textiles. However, they may also have higher elasticity and/or lower stiffness than inorganic fibers. Accordingly, they can contribute to the elasticity and flexibility of the composite substrate. In contrast, inorganic fibers such as glass fibers are not elastic, and fire barriers made therefrom confer undesired high stiffness to a composite substrate.

The limiting oxygen index (LOI) of the organic flame-resistant fibers is at least 25%, preferably at least 27%, or even at least 28%. Preferably, the LOI is in the range of 25% to 45%, especially from 28% to 35%. The LOI is the minimum concentration of oxygen, expressed as a percentage, that will support combustion of a polymer. It is measured by passing a mixture of oxygen and nitrogen over a burning specimen, and reducing the oxygen level until a critical level is reached. LOI values are typically provided in vol % and can be determined by standardized tests, such as the ISO 4589. Such high LOI values are characteristic for highly efficient flame resistant fibers, such as modacrylic fibers which have an LOI of about 29-30%.

Preferably, the combustion temperature of the organic flame-resistant fibers is at least 500° C., more preferably at least 600° C. For example, the combustion temperature can be determined according to ASTM D 3814. Such high combustion temperatures are characteristic for highly efficient flame resistant fibers. Preferably, the combustion temperature of the organic flame-resistant fibers is at least 600° C. and the limiting oxygen index (LOI) is at least 28%.

Preferably, the organic flame-resistant fibers have a relatively high melting point ($T_M$) of at least 200° C., more preferably at least 220° C. This is advantageous, because the organic flame-resistant fibers are not molten when used in the composite substrate for producing bituminous membranes at up to 200° C.

Preferably, the organic flame-resistant fibers do not melt before pyrolysis. Such fibers are known as char-forming fibers. Preferably, the melting temperature $T_M$ is equal, larger, or not significantly lower than the pyrolysis temperature $T_P$. Preferably, the difference $T_P-T_M$ is less than 50° C., more preferably less than 30° C. Preferably, $T_M$ and/or $T_P$ are determined according to ASTM D276-00a or ISO/TR 11827:2012(E). Such flame resistant fibers are pyrolyzed in the case of fire and preserve their basic fibrous structure. In the case of fire, the pyrolyzed flame-retardant fibers can stabilize the membrane, when the bitumen melts at around 180° C. The remaining fibrous structures provide a barrier and prevent molten bitumen from flowing and dripping into a building. In this regard, the use of modacrylic fibers is highly preferred, because they are char-forming fibers having a $T_M$ of >240° C. and $T_P$ of 273° C.

On the other hand, if the flame retardant fibers in a bituminous membrane would melt, the overall structure would collapse. There would be no residual barrier against fire spreading and the hot or burning molten composition could flow into the building. Therefore, it is not preferred that the melting or degradation temperature is significantly lower than the pyrolysis temperature. Preferably, the difference $T_P-T_M$ is not more than 100° C. For example, flame retardant polyester, which is produced by incorporating flame retardant additives into the fibers, has a melting temperature of about 255° C. and a significantly higher pyrolysis temperature of about 420-488° C. Such fibers are typically molten in the case of fire, such that the bituminous membrane collapses completely.

Preferably, the flame-retardant fibers have a relatively high flexibility and/or elasticity. Thus, they are preferably not stiff or rigid. This is advantageous for bituminous membrane applications. The relatively thin membranes should be sufficiently flexible to be rolled or unrolled. Further, the bituminous membranes are normally adapted to construction or building sites, which comprise edges and irregular surfaces. A certain degree of flexibility is also advantageous in the bitumen impregnation process, wherein the composite substrates it is led though a production line, which includes a hot bitumen bath, with standard machinery under stress and strain forces. If a composite substrate is rigid or stiff, it is more likely that it is damaged in such a process. For these reasons, it is difficult to process flame retardant glass fibers, which are stiff and not elastic, in such composite substrates and bituminous membranes.

Preferably, the breaking extension of the flame retardant fibers is at least 10%, more preferably at least 20%, measured at 25° C. Preferably, the breaking extension is between 10% and 60%, especially between 20% and 50%. Fibers having a breaking extension below 10% are relatively stiff and thus less desired. Preferably, the initial modulus of the fibers is between 5 and 15 N/tex. Fibers having an initial modulus above 15 N/tex require a relatively high force for stretching, which is less desirable. Fibers having a very low initial modulus have relatively low structural stability and are also less desired. For example, modacrylic fibers have a breaking extension of about 34% and an initial modulus of 8.8 N/tex and are thus highly suitable. Tensile properties such as breaking extension and initial modulus can be determined by standard test methods, preferably DIN EN ISO 5079:1996-02 or ASTM D3822/D3822M-14(2020).

Preferably, the softening temperature $T_G$ (glass transition temperature) of the flame-resistant fibers is less than 150° C., more preferably less than 100° C., as preferably determined by DSC, for example according to ASTM E 1356 or 11357. This is advantageous, because generally a low $T_G$ correlates with flexibility. In contrast, fibers having a high $T_G$ tend to be relatively stiff and rigid.

In an embodiment of the invention, the flame-resistant fibers are not aramid fibers, such as meta-aramid, para-aramid and kevlar fibers. Aramid fibers have a softening temperature of about 275° C. (meta-aramid) or 340° C. (para-aramid). Accordingly, they are relatively stiff and rigid at room temperature and even at 180° C., at which bituminous membranes are produced and used. Thus, the mechanical properties of composite substrates comprising aramid fibers are not optimal for producing bituminous membranes. It is also relatively difficult to form a nonwoven from the rigid and relatively tough aramid fibers by standard methods, such as carding, needling and cutting.

The organic flame-resistant fibers may comprise organic fiber polymers selected from modacrylic, polyacrylonitrile (PAN), poly-phenylene benzo-bisoxazole (PBO), polybenzimidazole (PBI) and/or melamine. These fiber raw materials can generally provide good fire barrier properties to textiles. Further, they are characterized by a relatively high combustion temperature and LOI.

In a specific embodiment, the fibers are modacrylic fibers and/or polyacrylonitrile fibers. Such fire-resistant fibers have excellent flame-resistant properties and can provide efficient fire barriers. They are especially advantageous, because they are pyrolyzed and not molten in the case of fire.

In a highly preferred embodiment, the fibers are modacrylic fibers. Modacrylic is a modified acrylic fiber co-polymer that is composed of less than 85%, but at least 35% by weight of acrylonitrile monomer. Typical co-monomers are halogenated vinyl or vinylidene monomers, especially vinyl chloride, vinylidene chloride or vinyl bromide. Modacrylic fibers are commercially available, for example from Kaneka, JP, or Fushon Rayva Fiber Ltd., CN. Preferably, the modacrylic fibers can be characterized as described in ASTM D276-00a. Modacrylic fibers are especially suitable, because they are normally pyrolyzed (carbonized), but are not molten in the presence of fire. For example, ASTM D276-00a indicates that modarylic fibers do not melt. According to the invention, it was found that they confer not only high flame resistance to the composite substrate, but also advantageous mechanical properties at cold and hot temperature. A composite substrate comprising such a fiber layer can be flexible, but at the same time have a high mechanical stability at cold and hot temperature.

In a preferred embodiment, the organic flame-resistant fibers are carbonized (pyrolyzed) in the presence of fire, for example at a temperature above 200° C., or above 250° C., or at even higher temperature. Such fibers are characterized in that they are not yet molten at such a temperature, but instead carbonized in a solid state. Thereby, they can maintain their basic structure and provide a fire barrier in a bituminous membrane.

In a specific embodiment, the organic flame-resistant fibers were partially carbonized (pre-carbonized) before fabrication of the composite substrate. In such a method, the carbon ratio by weight is increased, whereas the ratio of other elements is decreased. In this embodiment, the precursor fibers are preferably polyacrylonitrile or rayon. Such partially carbonized fibers are organic fibers, because they do not consist of 100% carbon, and they are not carbon fibers. Such pre-carbonized fibers can have relatively high melting points or do not melt at all in the presence of fire. To a certain extent, such pre-carbonized fibers can maintain mechanical properties of the polymer precursors, such as flexibility, elasticity and mechanical stability.

However, in a preferred embodiment, the organic flame-resistant fibers were not partially carbonized (pre-carbonized) before fabrication of the composite substrate. This can be advantageous, because fire-resistant fibers can become less flexible and elastic during pre-carbonization, which may not be desirable for bituminous membrane applications.

The first layer and the second nonwoven layer comprise polyester fibers. Polyesters are applicable because they can be highly stable at temperatures of about 200° C. In addition, the first nonwoven and second nonwoven layer should not comprise fibers which are molten or softened at 200° C. or less. However, the first and/or second layer may comprise other fibers which are relatively stable at hot temperature, for example polyamide fibers or natural fibers.

In a preferred embodiment, the first nonwoven and/or the second nonwoven layer, preferably both layers, comprise only fibers from polyester. Alternatively, they may comprise a certain ratio of other fibers, for example less than 50%, less than 20% or less than 10% by weight of all fibers in the respective layer. As the intermediate layer, the first and second nonwoven layer may comprise additives and can be impregnated with binder.

In a preferred embodiment, the fiber material of the first and/or second nonwoven layer, and more preferably of both layers, is only polyester. The polyesters can be selected from polyethylene terephthalate, polybutylene terephthalate and polyester copolymers. However, it is highly preferred that the polyester is polyethylene terephthalate (PET). This fiber polymer is especially applicable for bituminous membranes and building materials, because it has high heat and mechanical stability. According to the invention, it was found that a combination of first and second PET nonwoven layers with an intermediate flame-resistant fiber layer provides composite substrates for bituminous membranes with excellent properties in standard applications.

The fibers in the nonwoven composite can be spunlaid, melt-spun or staple fibers. In a preferred embodiment, the polymer fibers and/or the flame-resistant fibers are staple fibers. The composite substrate can be obtained from staple fibers easily and have advantageous properties. Staple fibers can be processed and laid into a nonwoven by conventional means, such as carding, and consolidated. Preferably, the length of the staple fibers is between 20 mm to 200 mm, more preferably between 60 mm to 100 mm.

The first, second and intermediate layer can be pre-consolidated or consolidated before combining them on top of each other to form the composite substrate or a laminate precursor. Preferably, the nonwoven layers are pre-consolidated before forming the composite, preferably mechanically, more preferably by pre-needling or hydroentangling. In a preferred embodiment, at least one of the nonwoven layers, especially the first and second nonwoven layer, are provided in the form of spun-bonded nonwovens from continuous spun filaments, which also can be mechanically pre-consolidated, especially by pre-needling.

The nonwoven layers, optionally in combination with additional layers or components, are laid over each other to form a laminate. Subsequently, the laminate is consolidated mechanically, and optionally also by other means. Preferably, the laminate is consolidated mechanically by needling and/or hydroentanglement.

Preferably, the composite substrate is subjected to thermal consolidation, preferably at a temperature at which at least some of the fibers are softened and thus cohesively bonded.

The porous composite substrate is suitable for producing a bituminous membrane. Due to its porosity, it is suitable for impregnation with molten bitumen. The term porous means that a liquid, such as molten bitumen, can enter and permeate the pores of the composite substrate. The liquid can pass through the porous composite substrate from one flat surface to the other flat surface. Accordingly, the bitumen can fill the pores of the composite substrate, which leads to an intimate connection after solidification. Porosity or void fraction is a measure of the void (i.e. "empty") space in a material, and is a fraction of the volume of voids over the total volume as a percentage between 0% and 100%. Preferably, the void fraction of the nonwoven carrier and/or of the nonwoven before binder impregnation is between 60% and 95%, more preferably between 75% and 93%, especially between 80% and 90%. The porosity can be calculated from the weight and density of the product and known densities of the components. Preferably, the average pore diameter is between 50 µm and 300 µm, preferably between 80 µm and 200 µm, as preferably determined by DIN ISO 9073-5:2008.

In contrast, the composite substrate is not a closed film, i.e. a solid part without pores. A solid part without pores, for example a thermoformed (pressed) part as disclosed in WO2013/064859, is not suitable for impregnation with bitumen and forming bituminous membranes. It can only be coated, but would then lack the intimate connection of the bitumen with the composite substrate described above. The inventive composite substrate is not thermoformed. When a binder is added to the composite substrate of the present invention, the amount is so low that the binder consolidated composite substrate remains porous.

In a preferred embodiment, the base weight of the first and/or second nonwoven layer is from 20 to 200 $g/m^2$, more preferably from 30 to 120 $g/m^2$, especially from 50 to 100 $g/m^2$, and/or the base weight of the intermediate layer is from 5 to 100 $g/m^2$, more preferably from 10 to 50 $g/m^2$, especially from 15 to 40 $g/m^2$.

Preferably, the linear density of the fibers of the first and second nonwoven layer and/or the intermediate nonwoven layer is from 0.5 to 20 dtex, more preferably from 1 to 10 dtex, especially in the range of 2 to 6 dtex. It was found that nonwovens from fibers in these diameter ranges provide appropriate strength and flexibility to the substrates and bituminous membranes. Moreover, flame-resistant fibers with such fiber diameters were found to confer excellent flame-resistant properties to the composite substrates.

According to the invention, it was found that a composite substrate with highly advantageous properties can be provided which consists of the first and the second nonwoven layer, the intermediate nonwoven layer and optionally inorganic reinforcing fibers. It was found that these layers and fibers are essentially sufficient for providing a substrate for bituminous membrane having excellent fire resistance and also mechanical properties. Therefore, it is preferred that the composite substrate does not comprise additional layers, especially no other nonwoven layers or other different layers, which are not nonwoven layers.

In nonwoven forming technology, a layer having a desired thickness can be produced by repeatedly laying fibers on top of each other, optionally followed by intermediate pre-consolidation. A nonwoven layer of the inventive composite substrate can be formed by such techniques and is nonetheless considered a single nonwoven layer. Further, each nonwoven layer of the composite substrate may comprise a gradient or other spatial variations of the composition.

The composite substrate may comprise at least one additional layer, for example one, two or three additional layers. An additional layer can be positioned somewhere between the first and second nonwoven layer or on the other side of the first and/or second nonwoven layer. Such additional layers may confer desired properties to the composite, such as higher strength or a desired functionality. However, it is preferred that the first and second nonwoven layers are the outer surfaces of the composite substrate, i.e. of the sheet material. This is advantageous, because the first and second polyester nonwovens can be impregnated efficiently with bitumen.

In a preferred embodiment, the composite substrate comprises inorganic reinforcing fibers. In a preferred embodiment, the inorganic reinforcing fibers are glass fibers. However, they can also be from other inorganic materials, such as silica or mineral fibers. Glass fibers are especially preferred, because they are easily available and commonly used in the technical field of bituminous membranes for increasing the mechanical strength.

The inorganic reinforcing fibers can be at any position in the composite substrate, which increases the overall mechanical stability. For example, they can be included into the first and/or second nonwoven layer. Further, the inorganic reinforcing fibers can be part of the intermediate layer. In these embodiments, the amount of inorganic reinforcing fibers in the first, second or intermediate layer should be relatively low, such that other basic properties of these layers can be maintained. Accordingly, the ratio of inorganic reinforcing fibers in the nonwoven layer should be not more than 20% by weight, preferably less than 10% by weight, for example from 1% to 20% by weight. In a preferred embodiment, the nonwoven layers of the composite substrate do not comprise inorganic reinforcing fibers.

In another preferred embodiment, the composite substrate comprises inorganic reinforcing fibers, which form a separate layer or which are included in a separate layer, which is not the first, second or intermediate layer. In a preferred embodiment, the composite substrate comprises an addition layer of inorganic reinforcing fibers. The additional layer of inorganic reinforcing fibers can be a nonwoven, a woven, a net or scrim, or a layer of fibers and/or yarns which are not connected with each other.

In a preferred embodiment, the inorganic reinforcing fibers are not provided in the form such that they cover the entire area of the substrate. For example, nets, scrims or aligned yarns comprise areas in which they do not cover the substrate, as opposed to inorganic fiber nonwovens. It is not necessary that such inorganic fibers cover the complete area, because a fire barrier function is provided by the intermediate layer.

In a highly preferred embodiment, the inorganic reinforcing fibers are present in the form of yarns, especially glass fiber yarns. Preferably, the yarns are aligned with each other, preferably in parallel. Aligned means that the yarns are not laid or arranged randomly. This is advantageous, because the mechanical strength of the composite substrate can be strongly increased by such yarns, especially when they are included in a directed, non-randomly arrangement. Further, yarns do not release small particles, and therefore avoid irritation, health and environmental problems of glass staple fibers and nonwovens.

In a preferred embodiment, the additional layer comprises parallel yarns of the inorganic reinforcing fibers. Preferably, the yarns are essentially straight. Preferably, the parallel yarns are aligned in machine direction. This is advantageous, because such yarns high strength to the composite substrate in machine direction, whereas they can be fed into the composite from nozzles in a production process with standard machinery. Such a production process is more convenient than the introduction of complete glass layers such as nonwovens or scrims, the handling of which is impaired by the stiffness of sheets. Although parallel yarns are normally not aligned with each other, a plurality of such aligned yarns, or yarns aligned in another form, can be considered a layer according to this description. Such aligned yarns may also be embedded in the first or second layer or in the intermediate layer.

In a preferred embodiment, the composite substrate comprises exactly four layers, which are the first and second layer, the intermediate layer and an additional layer of inorganic reinforcing fibers, especially in the form of aligned yarns. Preferably, the inorganic reinforcing fibers are positioned between the intermediate layer and the first nonwoven layer and/or between the intermediate layer and the second nonwoven layer. In another preferred embodiment, there are two, three or more layers of reinforcing inorganic fibers.

In a preferred embodiment, the composite substrate, which optionally comprises the inorganic reinforcing fibers, is mechanically consolidated at least in part by needle-punching. This is a nonwoven consolidation process in which a preformed fibrous web is mechanically entangled by repeated penetration of barbed needles. The process is carried out with a needle loom. Another preferred embodiment, the composite substrate is mechanically consolidated by hydroentanglement. Thereby, a preformed fibrous web is subjected to high pressure water jets. Further, it is preferred that a mechanical consolidation is provided by thermal bonding, for example with calendar rolls. Thereby, a fibrous web is passed through a pair of roles pressed against each other, which are heated.

In a preferred embodiment, the composite substrate is bonded with a binder. The binder is an adhesive, which bonds the fibers in the nonwovens together. The binder can be a thermoplastic, a curable binder and/or a thermoset binder. The binder can be a latex binder or a molten adhesive. The binder can be a conventional binder in the technical field, such as an acrylic, styrene butadiene, styrene acrylic, melamine, polyurethane or silicone binder; a thermoset resin, such as epoxy, polyester, urea formaldehyde, melamine or alkyd resin, or a natural binder, such as starch, natural rubber or a protein binder. It is preferred that the binder is crosslinked, because such binders typically have higher stability at hot temperature. Preferably, the binder is curable and consolidated after impregnation in a curing step, which can be mediated by heat, radiation or other means. In a preferred embodiment, the binder is selected from acrylic binders, such as styrene acrylic binder, and melamine binders, such as melamine formaldehyde.

Preferably, the load of binder (dry weight) on the composite substrate (without binder) is from 1% to 30%, preferably from 5% to 25%, more preferably from 5% to 15% by weight. The load can be advantageously determined by comparing the weight of the substrate without binder to the weight after binder impregnation, curing and drying.

In a preferred embodiment, the composite substrate comprises
(A) a first polyester fiber nonwoven layer,
(B) the intermediate nonwoven layer comprising organic flame-resistant fibers, preferably modacrylic fibers and/or polyacrylonitrile fibers, which can be partially carbonized,
(C) a second polyester fiber nonwoven layer, and
(D) an addition layer comprising inorganic reinforcing fibers in the form of parallel yarns, which is preferably positioned between the intermediate layer and the first and/or second nonwoven layer,
wherein the composite substrate is mechanically consolidated, preferably by needle-punching, bonded with a binder and has a base weight of 100 g/m$^2$ to 600 g/m$^2$.

Surprisingly, it was found that the composite substrate of the present invention provides a novel and unique combination of advantageous properties. On the one hand, the nonwoven layer of organic flame-resistant fibers confers excellent flame-resistant properties to the composite substrate. The composite material also has advantageous mechanical properties at room temperature, such as high stability and flexibility, which render it suitable for standard applications and processing. The mechanical properties at room temperature can be approximately comparable to a composite substrate, in which the organic flame-resistant fibers are replaced by additional polyester.

However, to the surprise of the inventors, it was found that the composite substrate has not only comparable, but superior mechanical properties at hot temperature. Specifically, it was found that the composite substrate has superior mechanical stability at about 180° C., when compared to a corresponding composite substrate without the organic flame resistant fibers. For example, the hot tensile deformation and maximum tensile strength at hot temperature are improved. This was unexpected, because flame-resistant fibers are generally included into such composite substrates for conferring flame resistance to the material, but not for improving other properties at hot temperature. The high mechanical strength at hot temperature is extremely advantageous for producing bituminous membranes, because a high integrity and stability is required for processing such nonwovens in a molten bitumen bath at around 180° C. In this process, thin nonwoven substrates are unwound and moved through the hot bitumen bath, followed by drying and rolling. The composite substrates must withstand such harsh temperature conditions in combination with mechanical strain, such that no damages are incurred. Due to the high stability at hot temperature, the composite is applicable for providing uniform, intact and stable bituminous membranes with standard machinery under standard conditions.

The composite substrate of the invention provides an efficient fire barrier. Preferably, the composite substrate passes standard tests for building and roofing materials for fire barrier function. In a preferred embodiment, the composite substrate passes the roofing test for external fire exposure of EN 1187 (test 1 and/or 2).

Preferably, the base weight of the intermediate layer is from 5 to 100 g/m², more preferably from 10 to 50 g/m², especially from 15 to 40 g/m².It was found that an efficient fire barrier can be provided with such a relatively light weight nonwoven intermediate layer.

In a preferred embodiment, the composite substrate has a base weight of 80 g/m² to 800 g/m², more preferably 100 g/m² to 500 g/m², especially 120 g/m² to 300 g/m². It was found that such composite substrates can provide an efficient fire barrier in combination with advantageous mechanical properties to bituminous membranes.

Preferably, the thickness of the composite substrate is between 0.25 mm and 6 mm, more preferably between 0.5 mm and 4 mm, and especially between 0.8 mm and 2 mm, as determined according to DIN EN ISO 9073-2, 1997, section 5.1, normal nonwovens.

In a preferred embodiment, the composite substrate has a hot tensile deformation at 180° C. and 80 N of less than 5%, more preferably less than 3% or less than 2%. Preferably, the hot tensile deformation is determined with a composite substrate which has a base weight of 100 g/m² to 600 g/m², especially between 150 g/m² to 450 g/m² or between 150 gm² to 250 g/m². The hot tensile deformation is an indicator of mechanical stability. Surprisingly, it was found that hot tensile deformation of the composite substrate is very low. Specifically, the initial modulus (Young modulus) at hot temperature is increased, which is an indicator of the stiffness of the material. Thus, it can be advantageously used for producing bituminous membranes with standard machinery in molten bitumen at hot temperatures. Further, the composite substrate has high stability and integrity, when it is applied to roofs in a standard procedure, in which the bitumen is softened with a hot flame. Further, the high stability at hot temperature indicates that the bituminous membranes remain stable for long time periods in building and roofing applications. Even in moderate climate, roof temperatures raise easily up to 100° C., for example when the sun shines directly on the roof. In hot geographical regions and for specific applications, such as metal or black roofs, temperatures may raise even higher. Therefore, the high stability at hot temperature is also highly advantageous for building and roofing applications.

In a preferred embodiment, the composite substrate has a maximum tensile strength at 180° C. of at least 75 N, preferably at least 80 N. The maximum tensile strength at hot temperature is also an important indicator of mechanical stability at hot temperature. The high hot tensile strength is advantageous, because the composite substrates and bituminous membranes can be subjected to high tension during the production process and during use in building and roofing applications. For example, such materials can be bent for covering irregular building parts, nailed, pressed between other parts, or subjected to stress and strain from external sources. Thus, it is important that the material is highly stable to avoid punctures, ruptures and the like. Thus, the high maximum tensile strength at hot temperatures indicates that the composite substrate has advantageous properties for building and roofing applications.

Preferably, the hot tensile deformation and/or the maximum tensile strength are determined with a dynamometer at 180° C. with at least 5, preferably 10 or 20 test specimens of 50 mm (CD)×180 mm (MD) each, a clamping length of 80 mm and take-off speed of 100 mm/min.

Preferably, the composite substrate has a high mechanical stability at room temperature (25° C.). Preferably, the maximum tensile strength is at least 300 N/5 cm, more preferably at least 350 N/5 cm. Preferably, the peak tenacity is at least 0.15, more preferably at least 0.2 daN/5 cm/g/m². Preferably, the elongation at break is at least 15%, more preferably at least 30%, and preferably is in the range of 15% to 60%.

Unless noted otherwise, the above parameters regarding mechanical stability are preferably determined in machine direction, more preferably in machine direction and cross-direction. Preferably, such properties are observed when the composite substrate has a base weight in the range of 100 g/m² to 600 g/m², especially between 150 g/m² to 450 g/m² and most preferably between 150 g/m² to 250 g/m².

As noted above, it was surprisingly found that the inventive composite substrate does not only provide a fire barrier, but also advantageous mechanical properties which are advantageous for bituminous membrane production and use. In a preferred embodiment, the maximum tensile strength at 180° C. in machine direction and/or the hot tensile deformation of the composite substrate at 180° C. and 80 N in machine direction is at least as high as for a comparative composite substrate, in which the organic flame-resistant fibers are replaced by polyester fibers. Preferably, the maximum tensile strength and/or the tensile deformation at 180° C. is at least as high, and preferably at least 10% higher, than of the comparative composite substrate. This comparative composite substrate is identical to the inventive composite substrate, with the exception of the intermediate layer with the organic flame-resistant fibers. The organic flame-resistant fibers are replaced by polyester fibers as present in the first and second nonwoven layer, such that the overall composite substrate has the same base weight and structure. Thus, differences of mechanical properties of the specimen can be attributed to the flame-resistant fibers.

Subject of the invention is also a bituminous membrane comprising a composite substrate according to at least one of the preceding claims, which is impregnated with bitumen.

The bituminous membrane is obtainable in a conventional process, in which the composite substrate of the invention, which is preferably bonded with a binder, is impregnated with molten bitumen in a bath. Typically, the composite substrate is provided in roll form, unrolled and directed through the hot bitumen bath, followed by cooling and solidification of the bitumen which has adhered to the substrate. After solidification, the bituminous membrane is rolled again, such that it can be stored, shipped and provided to the building sites in roll form. The bituminous membranes can be used for building and roofing applications by conventional methods. Typically, the bituminous membranes are provided in roll form, unrolled, subjected to temporary heat by flaming in order to soften at least a bituminous surface, laid on the application site, and if necessary adapted to the irregular structures of the application site. Subsequently, additional layers, such as insulating layers or tiles, are laid over the bituminous membranes. Methods for applying bituminous membranes in building applications are standardized in DIN V 20000-201.

Subject of the invention is also a building or roof comprising bituminous membranes according to the invention. The bituminous membranes, buildings and roofs of the invention comprise the composite substrates as disclosed above.

Subject of the invention is also the use of organic flame-resistant fibers for improving the mechanical strength and/or the dimensional stability (preferably in machine direction) of a composite substrate, which comprises the flame-resistant fibers, at a temperature between 150° C. and 250° C.

Preferably, the invention relates to the use of a composite substrate, which comprises the flame-resistant fibers, for improving the mechanical strength and/or the dimensional stability (preferably in machine direction) of a bituminous membrane at a temperature between 150° C. and 250° C. Preferably, the use is one is of an intermediate nonwoven layer, which comprises the organic flame-resistant fibers in a composite substrate. Subject of the invention is also the use of the inventive composite substrate for improving the mechanical strength, especially the hot tensile deformation at 180° C. and 80 N and/or the maximum tensile strength at 180° C. of a bituminous membrane.

Subject of the invention is also a method for producing a composite substrate or bituminous membrane of any of the preceding claims, comprising the steps of
(a) providing the first nonwoven and the second nonwoven layer, or a precursor web and/or pre-consolidated nonwoven layer for forming the first and/or second nonwoven layer,
(b) providing the intermediate nonwoven layer, or a precursor web or pre-consolidated nonwoven for forming the intermediate layer,
(c) combining the layers to obtain a laminate, and
(d) mechanically consolidating the laminate to obtain the composite substrate.

Steps (a) and (b) can be carried out in any order. In a preferred embodiment, all layers of the composite substrate are continuously fed into a single production line and combined in step (c) to obtain a laminate. It is preferred that all layers are combined simultaneously. For example, the nonwoven layers can be provided in the form of sheets from unwound rolls. Alternatively, at least one of the layers could be formed on another layer by depositing fibers, such as staple fibers or spun filaments in a spunbonding process.

However, it is preferred to provide the layers in the form of pre-consolidated nonwovens. In a preferred embodiment, the intermediate layer is provided in pre-needled form. It was found that such a pretreatment can especially provide improved stability and an efficient fire barrier to the composite substrate.

Preferably, the method is a continuous process. It is preferred that all layers are continuously fed into and combined in a single production line. If inorganic reinforcing fibers are included, it is preferred that they are also introduced and continuously fed in the same production line. Thereby, a laminate is obtained which includes the inorganic reinforcement. For example, the reinforcing fibers can be introduced in the form of parallel yarns. It is highly advantageous that the overall composite substrate can be obtained in a single production line by continuously feeding all components and combining them, preferably simultaneously, to obtain the laminate for subsequent consolidation. In the same production line, the laminate can be mechanically consolidated. Preferably, additional consolidation means can be provided in the same production line, such as means for binder impregnation or thermal consolidation, such as a calendar unit. Accordingly, the composite substrate can obtained as a sheet material of a desired length in roll form.

The intermediate nonwoven layer with the organic flame-resistant fibers confers fire resistance to the composite substrate of the invention. Therefore, it is not necessary that additional flame-resistant additives are included. In a preferred embodiment, the composite substrate does not comprise additional flame-resistant additives, such as fiber-finishing components, inorganic fillers or other fire-resistant fillers, additional fire-resistant layers, such as metal foils, fire-resistant films or other fire-resistant nonwovens, or fire-resistant matrix polymers or fire-resistant binder additives. In another embodiment of the invention, the flame-resistant properties of the composite substrate can be enhanced by including one or more of such additives or additional layer.

The composite substrate, the bituminous membranes, the uses and methods of the invention solve the problem underlying the invention. The invention provides a novel composite substrate for bituminous membranes, which has high mechanical stability at room temperature and even increased mechanical stability at hot temperature. At the same time, the composite substrate has excellent fire barrier properties. The composite product can be produced in a relatively simple and efficient process. The overall composite structure is not prone to delamination. The composite substrate has various advantages compared to conventional composite substrates to which fire resistance is provided by glass fibers. At first, the mechanical properties are much better, because glass fibers confer undesired stiffness to the material. Further, typical known problems for glass fibers, such as irritation, health problems and high manufacturing costs, can be avoided.

It is especially advantageous that the tensile deformation of the composite substrate at high temperature is low, such that the Young modulus is high. Thereby, the composite substrate can be processed without problems and damages at hot temperature, and further can confer stability to bituminous membranes in building and roofing applications. The high mechanical stability of the composite substrates at hot temperature provides runnability in standard machinery for producing bituminous membranes and long-term stability and integrity upon use.

EXAMPLES

Test Methods

Mechanical properties at 180° C. were determined by a tensile stress test as described in US2008/0214716 under modified conditions. The heat distortion resistance of PET nonwovens is characterized by tensile stress experiments with a tearing machine (dynamometer) with integrated thermostated chamber at T=180° C. For each measurement, 5 test specimens of 50 mm (CD)×180 mm (MD) each are prepared. The clamping length is 80 mm and the take-off speed is 100 mm/min. The elongation of the nonwoven is determined at 180° C. with increasing tensile force. The elongation determined for the 5 test specimens is stated for defined tensile forces. The dynamometer measured hot tensile deformation in MD at various different loads of 10 N, 30 N, 50 N and 80 N and the maximum tensile strength for each specimen.

Production of Composite Substrates

Composite substrates of the invention were produced. The properties were examined in comparison to conventional composite substrates for bituminous membranes. In examples 1 and 2, four-layer composite substrates were produced which comprised one first and one second outer polyester nonwoven layer, one intermediate organic flame-resistant fiber layer and one glass fiber reinforcement layer in the form of parallel yarns. The fiber materials and binder are summarized in table 1. The composite substrate was prepared in a method, for which process steps and conditions are summarized in table 2 below. The nonwoven layers were pre-consolidated as also summarized in table 2. The layers were combined in a crosslapper, which is a conventional device for producing nonwoven laminates from precursor materials. Parallel reinforcing glass yarns were introduced from feeding means, specifically guidance nozzles through which the unwound yarns from bobbins were directed. The laminate obtained thereby was consolidated by needling and thermal treatment, followed by impregnation with acrylic binder and curing. Some properties of the composite substrates and layers are summarized in table 3.

TABLE 1

Materials Fibers and Binders

| | Component | chemical name | count | trademark, manufacturer |
|---|---|---|---|---|
| 1 | first layer of PET fibers | recycled PET | 4.4 dtex | R-PET, Freudenberg (DE) |
| 2 | intermediate layer of fire-resistant fibers | modacryl | 3.3 dtex | Seven Modacrylic Fiber Fushun Rayva Fiber Ltd. (CN) |
| 3 | reinforcing fibers | glass yarn | 68 tex | Vetrotex, Saint Gobain (FR) |
| 4 | second layer of PET fibers | recycled PET | 4.4 dtex | R-PET, Freudenberg (DE) |
| 5 | binder for impregnating composite | styrene-acrylic + melamine formaldehyde | | BASF (DE) |

TABLE 2

Process Steps and Conditions pre-treatment of fibers and layers

| | | | | |
|---|---|---|---|---|
| 1 | first layer | carding | cross lapper | pre-needled |
| 2 | intermediate layer | carding | cross lapper | pre-needled together with layer 1 |
| 3 | reinforcing fibers | glass yarns | yarn distance 8 mm | |
| 4 | second layer | carding | cross lapper | pre-needled |

TABLE 2-continued

Process Steps and Conditions treatment of laminate

| | | | | |
|---|---|---|---|---|
| | mechanical consolidation | needling | total stroke density 80 stroke/cm$^2$ | RB 38 * |
| | thermal consolidation | thermal treatment | heatset | 210° C. |
| 5 | impregnation | binder | acrylic resin | dry add on 16% |
| | resin curing | binder | acrylic resin | 200° C. |

* regular barbed needles, 6.3 mm distance, 38 gauge

TABLE 3

Properties of Composite Substrates and Layers

| | | base weight [g/m$^2$] | |
|---|---|---|---|
| | Component | example 1 | example 2 |
| 1 | first layer PET fibers | 61.2 | 79.5 |
| 2 | intermediate layer fire-resistant fibers | 21.6 | 28.0 |
| 3 | reinforcing fibers | 8 | 8 |
| 4 | second layer PET fibers | 61.2 | 79.5 |
| | binder for impregnating composite (dry add-on) | 29 | 37 |
| | composite substrate (total) | 181 | 232 |
| | porosity (void fraction) [%] | 84.9 | 84.9 |
| | bulk density [kg/m$^3$] | 201.1 | 193.3 |
| | thickness [mm] | 0.9 | 1.1 |

Mechanical Properties of Composite Substrates

The mechanical properties of the composite substrates of examples 1 and 2 were determined by standard methods. Simultaneously, mechanical properties of conventional nonwovens with comparable structure and base weight were determined (comparative examples 3 and 4). The specimen of examples 3 and 4 are glass fiber-reinforced polyester nonwovens, which are commercially available under the trademark Texbond R from Freudenberg, DE, and which are applicable for preparing bituminous membranes. The comparative composite substrates of examples 3 and 4 have total base weights of 182 g/m$^2$ and 230 g/m$^2$ (see table 5) and had the same structure and composition, including the amount and type of binder and reinforcements, as composite substrates of examples 1 and 2, except that the fire-resistant fibers were replaced by respective amounts (21.6/28.0 g/m$^2$) of PET fibers, and were processed by a comparable production method. Properties of all specimens were examined at room temperature (25° C.) and at 180° C. The methods, conditions and results are summarized in tables 4 and 5.

TABLE 4

Properties of nonwovens of example 1 and example 3 (comparative)

|   | ° C. | direction | unit | ex. 1 | ex. 3 (comp) |
|---|---|---|---|---|---|
| mass per unit area | 25 | MD | g/m² | 181 | 182 |
|  | 25 | CD | g/m² | 178 | 182 |
| maximum tensile strength | 25 | MD | N/5 cm | 419 | 410 |
|  | 25 | CD | N/5 cm | 359 | 357 |
| tenacity peak | 25 | MD | daN/5 cm/g/m² | 0.23 | 0.22 |
|  | 25 | CD | daN/5 cm/g/m² | 0.20 | 0.20 |
| elongation at break | 25 | MD | % | 18 | 19 |
|  | 25 | CD | % | 42 | 39 |
| hot tensile deformation at 10N | 180 | MD | % | 0.25 | 0.25 |
| hot tensile deformation at 30N | 180 | MD |  | 0.61 | 0.66 |
| hot tensile deformation at 50N | 180 | MD |  | 0.99 | 1.26 |
| hot tensile deformation at 80N | 180 | MD |  | 1.81 | 11.86 |
| maximum tensile strength | 180 |  | N | 87 | 67 |

TABLE 5

Properties of Nonwovens of Examples 2 and Example 4 (Comparative)

|   | ° C. | direction | unit | ex. 2 | ex. 4 comp. |
|---|---|---|---|---|---|
| mass per unit area | 25 | MD | g/m² | 225 | 230 |
|  | 25 | CD | g/m² | 220 | 230 |
| maximum tensile strength | 25 | MD | N/5 cm | 505 | 587 |
|  | 25 | CD | N/5 cm | 495 | 486 |
| tenacity peak | 25 | MD | daN/5 cm/g/m² | 0.22 | 0.26 |
|  | 25 | CD | daN/5 cm/g/m² | 0.23 | 0.21 |
| elongation at break | 25 | MD | % | 28 | 32 |
|  | 25 | CD | % | 42 | 48 |
| hot tensile deformation at 10N | 180 | MD | % | 0.19 | 0.19 |
| hot tensile deformation at 30N | 180 | MD |  | 0.51 | 0.51 |
| hot tensile deformation at 50N | 180 | MD |  | 0.85 | 0.86 |
| hot tensile deformation at 80N | 180 | MD |  | 1.58 | 7.84 |
| maximum tensile strength | 180 |  | N | 86 | 65 |

The results demonstrate that the mechanical properties of inventive composite substrates of examples 1 and 2 at room temperature are comparable to the comparative composite substrates of examples 3 and 4. All composite substrates were flexible sheets, which can be rolled, unrolled and handled conveniently. The mechanical stability properties at room temperature are approximately similar. This demonstrates that the introduction of the intermediate nonwoven layer of organic flame-resistant fibers does not impair the stability at room temperature. Surprisingly, the results also demonstrate that, the mechanical stability at hot temperature of the inventive composite substrates is significantly higher than of the comparative composite substrates. As shown in tables 4 and 5, the hot tensile deformation of the inventive specimen is significantly lower at 180° C. Specifically, the initial modulus (Young modulus) at hot temperature is increased. Further, the maximum tensile strength is significantly higher at 180° C. These parameters are relevant indicators for mechanical stability at hot temperature. A low deformation at hot temperature, especially under high load, provides significant advantages in the bitumen impregnation process. Basically, this means that the inventive material maintains its shape. Thus, it can be processed more easily and conveniently, has improved runnability in standard machinery and can be impregnated more uniformly with bitumen. All this leads to advantageous properties of bituminous membranes which comprise such a heat stable composite substrate. Further, the bituminous membranes on a building site or roof is more dimensionally stable at hot temperature. Moreover, the higher maximum tensile strength at hot temperature demonstrates that the composite substrate and the bituminous membrane are more resistant to damages in the production process and upon use.

Fire Barrier Properties

Figure 1:
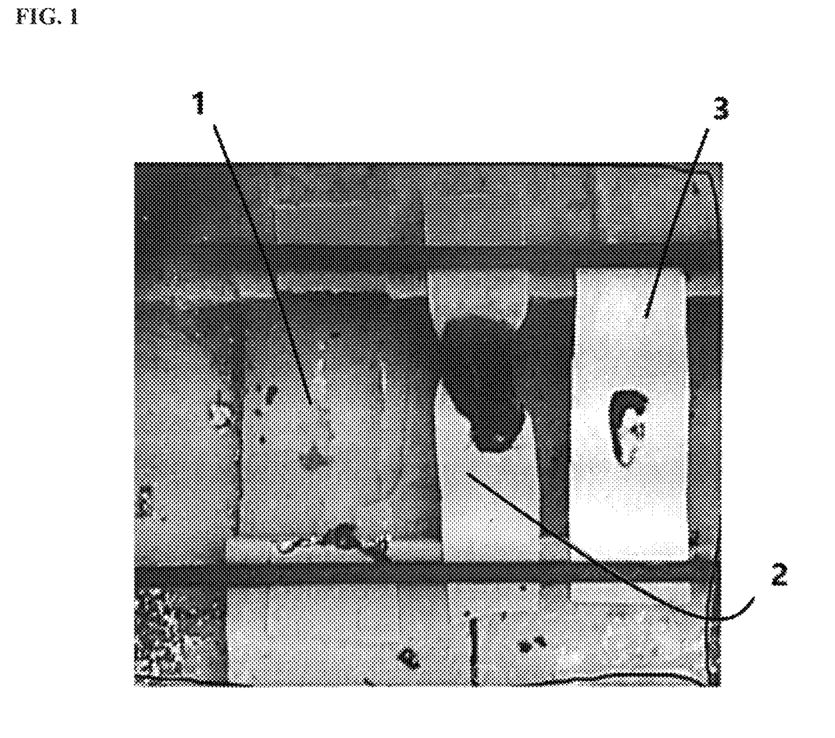
FIGS. 1 and 2 are photographs, which show performance of composite substrates of the invention and comparative composite substrates in a roofing test with burning brands of EN 1187 as described in the working examples.
Figure 2:
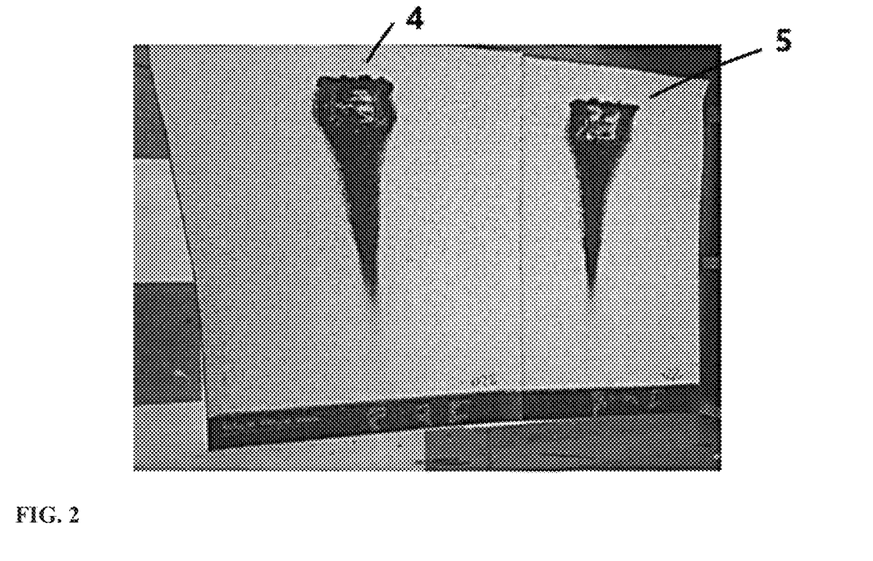

The performance of inventive composite substrates was examined in a standard roofing test 1 and 2 according to EN 1187. The test is for determining resistance of a roofing material to external fire exposure. Test 1 relates to exposure to burning brands and test 2 to burning brands and wind. The test was carried out with the composite substrate of the invention made from polyester fibers and an intermediate nonwoven layer comprising organic flame-resistant modacrylic fibers and comparative substrates of the same base weight consisting of 100% polyester fibers or 100% flame-resistant fibers. FIGS. 1 and 2 show photographs of the specimen after the tests. In FIG. 1, it can be seen that the comparative specimen 1 of 100% polyester fiber fully collapsed in the test, whereas comparative specimen 3 consisting of fire-resistant fiber remained its integrity. Although the inventive specimen 2 was slightly damaged, as indicated by the black sport, it also remained fully closed. Thus, it provides an efficient fire barrier as comparative fire resistant specimen 3.

Similarly, it was found in test 2 (FIG. 2) that inventive specimen 4 provides an efficient fire barrier on a membrane substrate as comparative specimen 5 consisting of fire-resistant fibers. Overall, the results provide evidence that the composite substrate of the invention provides an efficient fire barrier when used in a standard test for roofing material.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A porous composite substrate for producing bituminous membranes, comprising
    a first nonwoven and a second nonwoven layer which comprise polyester fibers, and
    an intermediate nonwoven layer comprising organic flame-resistant fibers, wherein a combustion temperature of the organic flame-resistant fibers is at least 500° C. and/or a limiting oxygen index (LOI) of the organic flame-resistant fibers is at least 25%,
    wherein the composite substrate is mechanically consolidated,
    wherein a linear density of the organic flame-resistant fibers of the intermediate nonwoven layer is from 0.5 to 20 dtex, and
    wherein no inorganic flame-resistant nonwoven fibers are present in the intermediate layer.

2. The composite substrate according to claim 1, wherein the organic flame-resistant fibers comprise at least one organic fiber polymer selected from modacrylic, polyacrylonitrile (PAN), poly-phenylene benzo-bisoxazole (PBO), poly benzimidazole (PBI) and/or melamine.

3. The composite substrate according to claim 2, wherein the organic fiber polymer is modacrylic.

4. The composite substrate according to claim 1, wherein a difference of a pyrolysis temperature (TP)—melting temperature (TM) is less than 50° C.

5. The composite substrate according to claim 4, wherein the difference is less than 30° C.

6. The composite substrate according to claim 1, further comprising inorganic reinforcing fibers.

7. The composite substrate according to claim 6, which comprises an addition layer of the inorganic reinforcing fibers.

8. The composite substrate according to claim 6, wherein the inorganic reinforcing fibers are in the form of yarns.

9. The composite substrate according to claim 6, wherein the inorganic reinforcing fibers are in the form of parallel yarns.

10. The composite substrate according to claim 1, which is mechanically consolidated by needle-punching.

11. The composite substrate according to claim 1, which is bonded with a binder.

12. The composite substrate of claim 1, comprising
    (A) a first polyester fiber nonwoven layer,
    (B) the intermediate nonwoven layer comprising organic flame-resistant fibers,
    (C) a second polyester fiber nonwoven layer, and
    (D) an addition layer comprising inorganic reinforcing fibers in the form of parallel yarns,
    wherein the composite substrate is mechanically consolidated, bonded with a binder and has a base weight of 100 g/m2 to 500 g/m2.

13. The composite substrate according to claim 12, wherein the organic flame-resistant fibers comprise modacrylic fibers and/or polyacrylonitrile fibers, optionally carbonized.

14. The composite substrate according to claim 12, wherein the addition layer comprising inorganic reinforcing fibers in the form of parallel yarns is positioned between the intermediate layer and the first and/or second nonwoven layer.

15. The composite substrate according to claim 12, wherein the composite substrate is mechanically consolidated by needle punching.

16. The composite substrate according to claim 1, having at least one of the following properties:
    (i) base weight of 50 g/m$^2$ to 800 g/m$^2$
    (ii) a hot tensile deformation at 180° C. and 80 N of less than 5%
    (ii) a maximum tensile strength at 180° C. of at least 75 N
    (iv) it passes roofing test 1 and/or 2 for external fire exposure of EN 1187.

17. The composite substrate according to claim 1, wherein a maximum tensile strength at 180° C. in machine direction and/or a hot tensile deformation of the composite substrate at 180° C. and 80 N in machine direction is at least as high as for a comparative composite substrate, in which the organic flame-resistant fibers are replaced by polyester fibers.

18. A bituminous membrane, which comprises a composite substrate according to claim 1, which is impregnated with bitumen.

19. A building or roof comprising the bituminous membrane according to claim 18.

20. A method for producing the composite substrate of claim 1, comprising the steps of
    (a) providing the first nonwoven and the second nonwoven layer, or precursor web and/or pre-consolidated nonwoven layer for forming the first and/or second nonwoven layer,
    (b) providing the intermediate nonwoven layer, or a precursor web or pre-consolidated nonwoven layer for forming the intermediate nonwoven layer,
    (c) combining the layers to obtain a laminate, and (d) mechanically consolidating the laminate to obtain the composite substrate, optionally wherein all layers are continuously fed into and combined in a single production line.

21. The composite substrate according to claim 1, wherein the linear density of the organic flame-resistant fibers of the intermediate nonwoven layer is from 1 to 10 dtex.

* * * * *